Oct. 18, 1966     I. S. GOTTSCHO     3,279,425
HOT MELT APPLICATION TO CONTINUOUS WEBS
Filed Nov. 14, 1963     2 Sheets-Sheet 1

INVENTOR.
IRA S. GOTTSCHO
BY
Montgomery
ATTORNEY

Oct. 18, 1966    I. S. GOTTSCHO    3,279,425
HOT MELT APPLICATION TO CONTINUOUS WEBS
Filed Nov. 14, 1963    2 Sheets-Sheet 2

INVENTOR.
IRA S. GOTTSCHO
BY
*Montgomery*
ATTORNEY

United States Patent Office 3,279,425
Patented Oct. 18, 1966

3,279,425
HOT MELT APPLICATION TO CONTINUOUS WEBS
Ira S. Gottscho, Milburn, N.J., assignor to Adolph Gottscho, Inc., Hillside, N.J., a corporation of New York
Filed Nov. 14, 1963, Ser. No. 323,838
9 Claims. (Cl. 118—202)

This invention relates generally to the application of a hot melt to a web of paper, plastic, aluminum foil or the like as the web is being fed to a packaging machine which cuts the web into predetermined lengths or sections utilized for the wrapping of articles.

A so-called hot melt is a mixture of wax and glue which, upon being heated, becomes liquid so that it can be handled and applied to a web in the same manner as a liquid ink or adhesive. The hot melt solidifies on the web at the locations where it is applied to the latter in predetermined spaced apart patterns so that, upon the cutting of the web into sections and the wrapping of articles in such sections by the associated packaging machine, the patterns of hot melt are located for use in sealing each package by the application of moderate heat thereto.

Since the web is usually preprinted prior to the feeding of the web to the packaging machine, it is essential that the patterns of hot melt applied to the web be registered with respect to the previously applied printed patterns and also with respect to the lines along which the web is transversely cut when being separated into sections for utilization in the wrapping of articles in the packaging machine. Apparatus previously available for applying hot melt to a web as the latter is fed to a packaging machine has employed a flexographic system for that purpose. Such apparatus is disadvantageous in that the flexographic system for applying the hot melt is not suitably accurate or precise in defining the areas or patterns of hot melt on the web, and further the rubber impression or pattern wheel for transferring the hot melt to the web tends to wear and therefore is not conveniently suitable for use in situations where continuous production is desired. The existing apparatus also has an independent drive, that is, a drive independent of the packaging machine to which the web is fed, so that it requires an arrangement for registering the patterns of applied hot melt with respect to the cutoff lines of the web in the packaging machine and also with respect to previously printed patterns on the web. The existing independently driven apparatus for applying hot melt is also bulky or large so that it cannot be conveniently installed, particularly adjacent to a packaging line where only a small space may be available.

Accordingly, it is an object of this invention to provide an apparatus for repeatedly applying patterns of hot melt to a continuous web being fed to a conventional packaging machine, which apparatus is driven from the packaging machine so as to obtain accurate registration of the applied patterns of hot melt with respect to the lines along which the web is cut in the packaging machine and further with respect to reprinted patterns on the web.

A further object is to provide an apparatus of the described character operating on the gravure principle so as to produce accurate and sharply defined patterns of applied hot melt.

In accordance with an aspect of this invention, an apparatus for applying patterns of hot melt to a continuous web as the latter is fed to a conventional packaging machine comprises a gravure cylinder having recesses or depressions in its surface corresponding to the pattern to be applied and being rotatably mounted so that its lower portion is immersed in a body of hot melt contained in a reservoir, a doctor blade engaging the surface of the gravure cylinder for removing hot melt from the latter except at those areas having the gravure depressions or recesses, means for heating the reservoir and gravure cylinder, and preferably also the doctor blade, thereby to maintain the hot melt in the liquid state until its application or transfer to the web, means guiding the web into contact with the surface of the gravure cylinder at a location along the web between the supply roll from which the web is unwound and the packaging machine, and means driving the gravure cylinder from the packaging machine so as to effect a single revolution of the gravure cylinder for each cutoff operation of the packaging machine, the circumference of the gravure cylinder being slightly less than the length of each section cut from the web by the packaging machine, thereby to avoid an accumulative error in registration between the hot melt applying apparatus and the associated packaging machine.

The above, and other objects, features and advantages of the invention, will be apparent in the following detailed description of an illustrative embodiment thereof which is to be read in connection with the accompanying drawings forming a part hereof, and wherein.

Figures 1, 3:
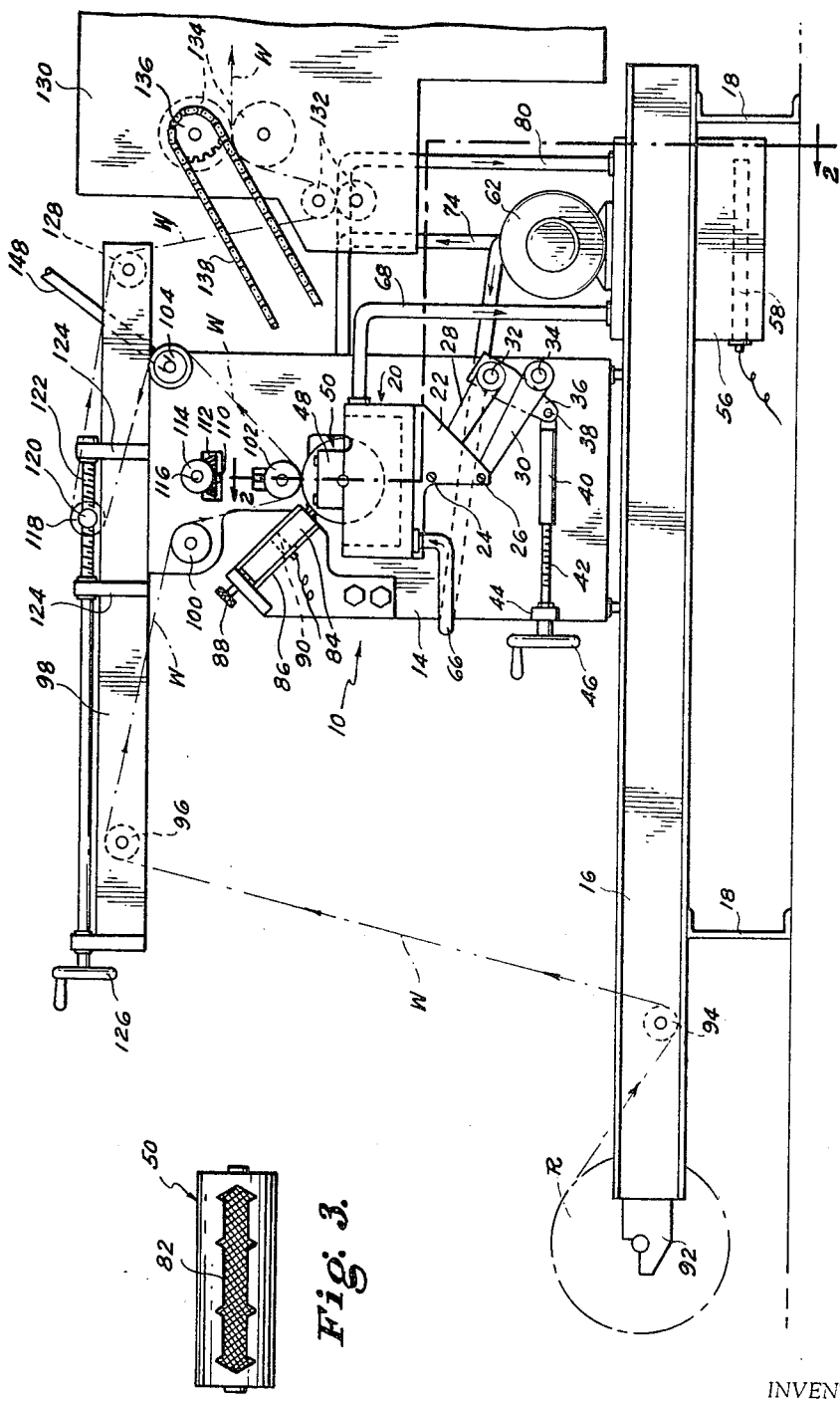
FIG. 1 is a diagrammatic side elevational view of a hot melt applying apparatus embodying this invention, and which is shown partly in vertical section and associated with a conventional packaging machine.
FIG. 3 is an elevational view of the gravure cylinder included in the apparatus of FIG. 1.
Figure 2:
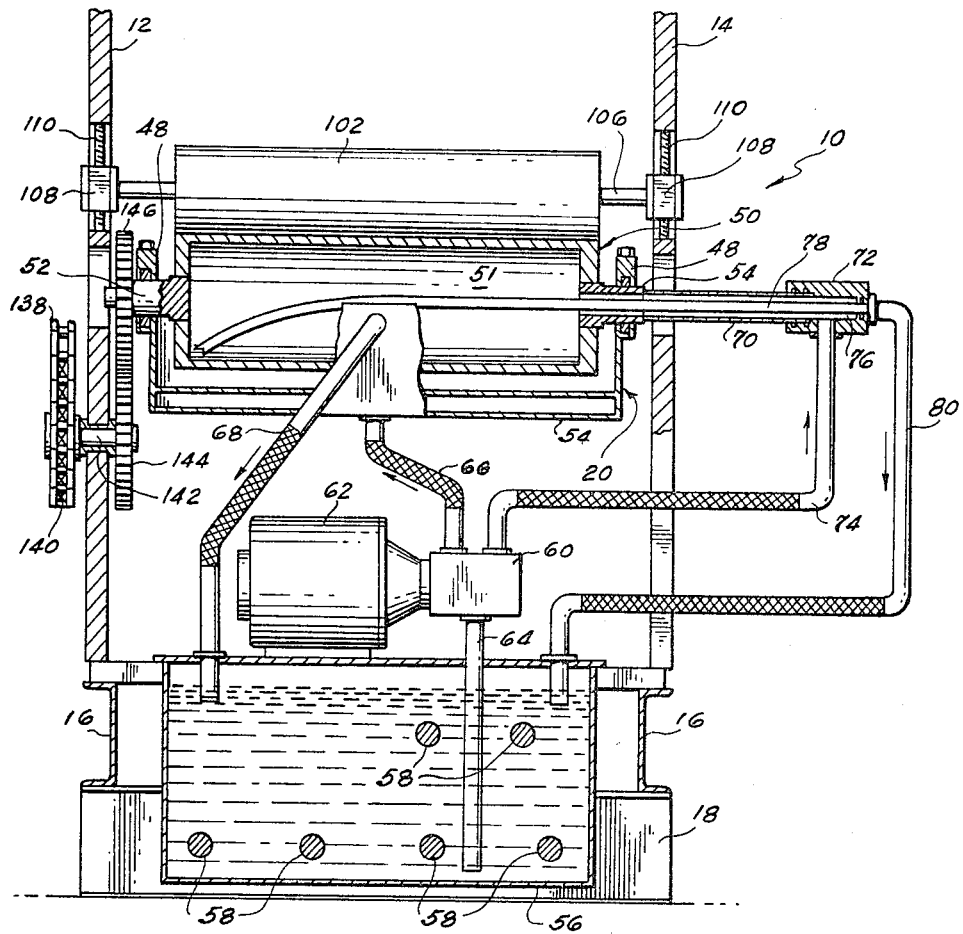
FIG. 2 is an enlarged, transverse sectional view taken along the line 2—2 of FIG. 1.

Referring to the drawings in detail and initially to FIGS. 1 and 2 thereof, it will be seen that an apparatus for applying hot melt to a continuous web in accordance with this invention is there generally identified by the reference numeral 10 and shown to comprise vertical, laterally spaced apart side frame members 12 and 14 mounted on a base made up of spaced apart longitudinal beams 16 secured together by transverse beams 18.

A hot melt fountain or reservoir 20 is disposed between side frame members 12 and 14 and, in the illustrated embodiment, has laterally spaced depending lugs 22 (FIG. 1) pivotally mounted at vertically spaced apart locations, as at 24 and 26, on pairs of parallel swinging arms 28 and 30 extending from lateral shafts 32 and 34. The shafts 32 and 34 are vertically spaced apart by the same distance as that between the pivots 24 and 26 and are suitably journalled in said frame members 12 and 14. In order to control the vertical position of the hot melt reservoir 20, a crank arm 36 is secured on shaft 32 and pivotally connected, as at 38, to an internally threaded link 40 which receives an adjusting screw shaft 42. The screw shaft 42 is rotatably mounted, and held against axial displacement, in a bearing structure 44 secured to side frame member 14, and a hand wheel 46 is secured to the screw shaft 42 so as to permit manual rotation of the latter. It will be apparent that rotation of the screw shaft 42 either extends or retracts the latter relative to the internally threaded link 40 and thereby rocks crank arm 36, and hence shaft 32 and the arms 28 extending therefrom, for either lowering or raising, respectively, the hot melt reservoir 20.

Separable, split bearing structures 48 are provided on top of the sides of hot melt reservoir 20, and a gravure cylinder, generally identified by the reference numeral 50, has trunnions 52 and 54 (FIG. 2) projecting axially from its opposite ends, and being releasably journalled in the split bearing structures 48.

In order to maintain the hot melt in the liquid state until its application to the web, both the reservoir 20 and the gravure cylinder 50 are heated. In the illustrated apparatus 10, such heating is effected by a system circulating hot oil through the hollow interior or cavity 51 of gravure cylinder 50 and through a jacket 54 (FIG. 2) extending around reservoir 20.

As shown particularly on FIG. 2, the hot oil heating system includes an oil tank 56 suspended between longitudinal beams 16 of the base, and electrical resistance heaters 58 extending into the tank 56 for heating a body of oil contained therein. A pump 60 driven by an electric motor 62 is mounted on top of tank 56 and has its inlet connected to a pipe 64 projecting downwardly into the tank for drawing heated oil from the latter. One outlet of pump 60 is connected to a conduit 66 formed at least in part of flexible hose and extending to the bottom of jacket 54 of reservoir 20, and a return conduit 68 extends from a location adjacent the top of jacket 54 at the front of reservoir 20 and opens into the tank 56. The trunnion 54 at one end of cylinder 50 is hollow and provided with a tubular extension 70 turnably received in a rotary union 72 of a type that is commercially available. A second outlet of pump 60 is connected through a conduit 74, formed at least in part of flexible hose, to an internal cavity 76 of rotary union 72. A return or syphon pipe 78 having an outer diameter substantially smaller than the internal diameter of tubular extension 70 and cavity 76 extends through the latter, and through tubular extension 70 and trunnion 54 and opens within the interior 51 of cylinder 50 at a location near the bottom of the cylinder and near the end of the latter remote from trunnion 54. A return conduit 80, also formed at least in part of flexible hose, extends from syphon 78 at union 72 and opens into tank 56.

From the above, it will be apparent that hot oil is continuously circulated by pump 60 from tank 56 through conduit 66 to the jacket 54 of reservoir 20 and returned from such jacket through conduit 68 to the tank 56. Simultaneously, hot oil is continuously circulated from tank 56 through conduit 74, union 72, extension 70 and trunnion 54 into the interior 52 of cylinder 50, and returned from the latter by way of syphon pipe 78 and conduit 80 to the oil tank 56. Thus, a body of hot melt contained in reservoir 20 is continuously maintained in the liquid state, and hot melt is picked up by the surface of cylinder 50, and maintained in the liquid state on the latter, as cylinder 50 is rotated, as hereinafter described in detail, within reservoir 20.

As shown on FIG. 3, the surface of cylinder 50 is formed with a gravure depression or recess 82 corresponding in shape to the pattern of hot melt to be repeatedly applied to the web. In order to remove the liquid hot melt from the surface of cylinder 50 except in the region of the gravure depression 82, so that only the hot melt collected in that depression will be applied to the web, the illustrated apparatus 10 further includes a doctor blade 84 (FIG. 1) engaging the surface of cylinder 50 at the side of the latter moving upwardly out of reservoir 20 during rotation of the gravure cylinder. The doctor blade 84 has its body guided in brackets 86 for movement radially toward and away from the surface of cylinder 50 by suitable adjusting screws 88. In order to ensure that the hot melt scraped from the surface of cylinder 50 by doctor blade 84 will remain in the liquid state for return to the reservoir 20, the body of doctor blade 84 is preferably heated, for example, by electrical resistance heaters 90, as indicated in broken lines on FIG. 1.

The web W to which hot melt is to be applied by apparatus 10 is unwound from a supply roll R (FIG. 1) rotatably supported on brackets 92 extending from one end of longitudinal beams 16. The web W travels from roll R under a guide roller 94 journalled between beams 16 and then upwardly around a guide roller 96 having its ends journalled in the sides of an upper horizontal frame 98 mounted on top of side frame members 12 and 14. From idler or guide roller 96, the web W travels over a guide roller 100 then under a back-up roller 102 and upwardly and around a guide roller 104. The guide rollers 100 and 104 are journalled, at their ends, in side frame members 12 and 14. The back-up or pressure roller 102 is disposed immediately above gravure cylinder 50 and is rotatably mounted on a shaft 106 carried, at its ends, by slides 108 mounted on jack screws 110 for vertical movement relative to the side frame members 12 and 14. The upper ends of jack screws 110 carry bevel gears 112 meshing with related bevel gears 114 secured on a laterally extending shaft 116 (FIG. 1) so that rotation of shaft 116, for example, by manipulation of a hand wheel (not shown) thereon, simultaneously turns both jack screws 110 for uniformly adjusting the vertical positions of both slide blocks 108. Thus, back-up roller 102 can be vertically adjusted relative to gravure cylinder 50 to provide the desired contact pressure between the surface of the gravure cylinder and web traveling under back-up roller 102.

After running around idler roller 104, the web W is looped around a registration adjusting roller 118 which is journalled in bearings 120 threadably engaged by adjusting screws 122 rotatable in bearing brackets 124 secured on horizontal frame 98. The adjusting screws 122 have hand wheels 126 thereon by which screws 122 may be manually turned to displace the axis of rotation of roller 118 horizontally, thereby to increase or decrease the length of the loop in web W between roller 104, roller 118 and an idler roller 128 journalled in frame 98 adjacent the end of the latter closest to a conventional packaging machine 130.

The packaging machine 130 may be of the type available under the designation Model FA, FA–2 or FA–4 from The Package Machinery Company, of East Longmeadow, Massachusetts, and includes draw rollers 132 which receive the web from the idler roller 128 and feed the web to cooperate cutting or knife cylinders 134 by which the web is cut into separate sections to be used in the machine 130 for the wrapping of articles, for example, bread, candy or the like.

Figure 4:
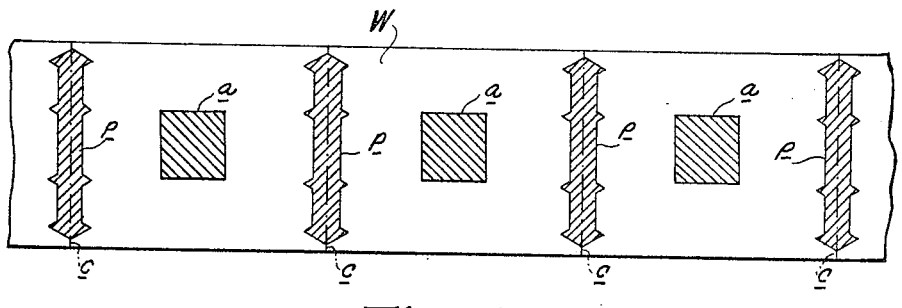
FIG. 4 is a diagrammatic plan view illustrating repeated patterns of hot melt applied to the continuous web by the apparatus embodying this invention.

In accordance with the present invention, the gravure cylinder 50 of apparatus 10 is driven from the packaging machine 130 so as to effect a single complete revolution during the feeding of each section of the web into the packaging machine 130 and the cutting of such section from the remainder of the web by the cutting or knife cylinders 134. Further, the gravure cylinder 50, which is conveniently interchangeable with other gravure cylinders of different diameters, is selected so that its circumferential dimension is slightly smaller, for example, by approximately .015", than the length of each section cut from the web W by the packaging machine 130. This dimension may vary from .010" to .035" depending upon the particular wrapping machine. Thus, when the draw rolls 132 of packaging machine 130 feed a predetermined length of the web and that length or section of the web is cut by cylinders 134, there will be a small increment of sliding movement of the web relative to the surface of the gravure cylinder 50. Although such increment of sliding movement of the web relative to the gravure cylinder may vary slightly during successive operating cycles, it ensures that there will not be accumulative error in the registration of the patterns of hot melt applied repeatedly the web W, as indicated at $p$ on FIG. 4, relative to the lines $c$ along which the web is cut into separate sections and also relative to the preprinted patterns $a$ which are accurately registered relative to the cut lines $c$ by the normal operation of the packaging machine 130.

As shown on FIGS. 1 and 2, the gravure cylinder 50 may be driven from the packaging machine 130 by a transmission that includes a sprocket 136 fixed on the shaft of one of the cutting or knife cylinders 134 and driving a chain 138 which runs around a sprocket 140 secured to the outer end of a shaft 142 journalled in side frame member 12 of apparatus 10. A spur gear 144 is fixed on the inner end of shaft 142 and meshes with a spur gear 146 secured to the trunnion 52 of cylinder 50.

It will be apparent that initial registration of the patterns p of hot melt applied to the web W with respect to the cut-off lines c and preprinted patterns a may be effected by horizontally adjusting the roller 118, as described above, thereby to increase or decrease the length of the loop formed in the web between roller 118 and rollers 104 and 128, for varying the length along the web between the line of contact of the latter with cylinder 50 and the line of contact of the web with knife cylinders 134 of the packaging machine.

Since the gravure cylinder 50 which applies patterns of the hot melt to web W is heated, and since certain articles to be wrapped in the sections cut from the web, for example, bars of chocolate, may be adversely affected by an elevated temperature of the wrapping material, one or more of the idler rollers engaged by the web following the application of hot melt thereto may be arranged to cool the web. Thus, as shown diagrammatically on FIG. 1, the idler roller 104 may be hollow and suitably connected, at its opposite ends, to concuits 148 by means of which cold water is circulated through the interior of roller 104.

Since the apparatus 10 is driven directly from the packaging machine 130, and thus does not require an independent drive mechanism or independent devices for maintaining registration of the locations of the applied patterns of hot melt p relative to the cut-off lines c or the preprinted patterns a, such apparatus 10 may be relatively compact for convenient installation adjacent the packaging machine even though only a relatively small space is available for that purpose.

Although an illustrative embodiment of this invention has been described in detail herein with reference to the accompanying drawings, it is to be understood that the invention is not limited to that precise embodiment, and that various changes and modifications may be effected therein by one skilled in the art without departing from the scope or spirit of the invention, except as defined in the appended claims.

What is claimed is:
1. The combination of
a packaging machine operative to wrap articles in sections of wrapping material cut successively from a continuous web thereof which is fed into said machine;
apparatus for applying spaced apart patterns of hot melt to the web as the latter is fed to said machine and comprising a rotatable gravure cylinder having a gravure depression covering only a portion of the circumference of the cylinder and corresponding to the pattern of hot melt to be applied to the web, a reservoir containing hot melt in which said cylinder is partly immersed, means engaging the surface of said cylinder for removing hot melt from the latter save at said gravure depression, means heating at least said reservoir so as to maintain the hot melt in liquid state prior to application to the web, and guide means engaging the web in advance of said packaging machine and leading the latter into contact with said gravure cylinder so as to receive hot melt from said gravure depression of the latter; and
means driving said gravure cylinder from said packaging machine so as to effect a single complete revolution of said gravure cylinder during the feeding of each section of the web into the packaging machine; said gravure cylinder having a circumference slightly smaller than the dimension of each section of the web in the longitudinal direction of the latter, thereby to avoid cumulative errors in the registration of the applied patterns of hot melt with the successive sections.

2. The combination as in claim 1; wherein the means engaging the said cylinder for removing hot melt from the latter save at the gravure depression comprises a doctor blade.

3. The combination as in claim 2; wherein said apparatus further comprises means for heating said doctor blade.

4. The combination as in claim 1; further comprising cooling means engaging the web at a location along the latter between said gravure cylinder and said packaging machine.

5. The combination of
a packaging machine operative to wrap articles in sections of wrapping material and including means for feeding a continuous web of wrapping material into said machine, and cutting means operative to cut the web along transversely extending cut lines which are spaced apart in the longitudinal direction of the web by a predetermined distance, so that the portions of the web between said cut lines form said sections of wrapping material;
apparatus for applying spaced apart patterns of hot melt to the web comprising a rotatable gravure cylinder having a peripheral surface with a gravure depression therein covering only a portion of the circumference thereof and corresponding to the shape of the patterns of hot melt to be applied to the web and with a circumference smaller, by approximately .010 to .035 inch, than said predetermined distance between the cut lines, a reservoir containing hot melt in which said cylinder is partly immersed, a doctor blade engaging the surface of said cylinder for removing hot melt from the latter save at said gravure depression, means heating at least said reservoir so as to maintain the hot melt in liquid state prior to application to the web, and guide means engaging the web in advance of said packaging machine and leading the latter into contact with the top of said gravure cylinder so as to receive hot melt from said gravure depression of the latter; and
means driving said gravure cylinder from said cutting means of the packaging machine and being operative to effect a single complete revolution of said gravure cylinder during the feeding of each section of the web into said machine, the web slipping by a small increment relative to said cylinder during the cutting of the web into sections, thereby to avoid cumulative errors in the registration of the applied patterns of hot melt with the successive sections cut from the web.

6. The combination as in claim 5; wherein said apparatus further comprises means for heating said doctor blade so that the hot melt removed from the gravure cylinder is maintained in the liquid state for return to said reservoir.

7. The combination as in claim 5; further comprising means cooling the web at a location along the latter between the contact of the web with said gravure cylinder and the entry of the web into the packaging machine.

8. The combination as in claim 5; wherein said gravure cylinder is hollow and said reservoir has a jacket extending therearound; and
wherein said means for heating the reservoir and cylinder includes a tank containing a liquid heat transfer medium, heating means in said tank for heating said medium, and means operative to circulate heated medium from said tank through said jacket of the reservoir and said hollow gravure cylinder.

9. The combination as in claim 5; wherein said cutting means of the packaging machine is rotary; and
wherein said means driving the gravure cylinder includes mechanical transmission means connecting said rotary cutting means with said gravure cylinder and having a 1:1 ratio.

References Cited by the Examiner

UNITED STATES PATENTS

| 438,529 | 10/1890 | Cox | 226—195 X |
|---|---|---|---|
| 1,043,021 | 10/1912 | Mayer | 118—33 |
| 1,768,488 | 6/1930 | Remington | 118—42 |
| 1,982,697 | 12/1934 | Royal | 118—68 X |
| 2,659,340 | 11/1953 | Zinn | 118—202 |
| 3,134,126 | 5/1964 | Phillips | 118. |

FOREIGN PATENTS 149,791    8/1920    Great Britain.

CHARLES A. WILLMUTH, *Primary Examiner.*

LEON G. MACHLIN, *Assistant Examiner.*